United States Patent
Clark et al.

(10) Patent No.: US 7,664,688 B2
(45) Date of Patent: Feb. 16, 2010

(54) MANAGING INFORMATION IN A MULTI-HUB SYSTEM FOR COLLABORATIVE PLANNING AND SUPPLY CHAIN MANAGEMENT

(75) Inventors: Gregory Scott Clark, Hillsborough, CA (US); Aynur Ünal, Palo Alto, CA (US); Michael Meehan, Palo Alto, CA (US)

(73) Assignee: E2open, Inc., Foster City, CA (US)

( * ) Notice: Subject to any disclaimer, the term of this patent is extended or adjusted under 35 U.S.C. 154(b) by 0 days.

(21) Appl. No.: 10/675,926

(22) Filed: Sep. 30, 2003
(Under 37 CFR 1.47)

(65) Prior Publication Data

US 2004/0236666 A1 Nov. 25, 2004

Related U.S. Application Data

(60) Provisional application No. 60/473,092, filed on May 23, 2003.

(51) Int. Cl.
*G06Q 40/00* (2006.01)
(52) U.S. Cl. .......................................... 705/35; 705/1
(58) Field of Classification Search .................. 705/35, 705/40, 44, 1; 709/204
See application file for complete search history.

(56) References Cited

U.S. PATENT DOCUMENTS

| | | | |
|---|---|---|---|
| 5,924,072 A | 7/1999 | Havens | |
| 6,115,690 A | 9/2000 | Wong | |
| 6,119,149 A * | 9/2000 | Notani | 709/205 |
| 6,163,859 A | 12/2000 | Lee et al. | |
| 6,202,159 B1 | 3/2001 | Ghafir et al. | |
| 6,292,830 B1 | 9/2001 | Taylor et al. | |
| 6,314,468 B1 | 11/2001 | Murphy et al. | |
| 6,909,741 B1 * | 6/2005 | Smith et al. | 375/222 |
| 2002/0010741 A1 | 1/2002 | Stewart et al. | |
| 2002/0099598 A1 * | 7/2002 | Eicher et al. | 705/11 |
| 2002/0188513 A1 * | 12/2002 | Gil et al. | 705/22 |

(Continued)

FOREIGN PATENT DOCUMENTS

JP 2007-524152 8/2007

(Continued)

OTHER PUBLICATIONS

60428214.*

(Continued)

*Primary Examiner*—Lalita M Hamilton
(74) *Attorney, Agent, or Firm*—Swernofsky Law Group PC (57) ABSTRACT

A method and system for managing information in a multi-hub system for supply chain management and collaborative planning. A technique is presented from managing communications in a multi-hub model. First, consistency of data throughout the system is maintained by limiting which entities in the supply chain have the authority to write to the data. Various techniques for determining which entity has such authority are presented. Second, the relative complexity of transactions is determined by identifying how much computer processing is required. Transactions that require little processing are handled by lightweight servers; transactions that required moderate to extensive processing are sent to heavyweight servers. The end user receives information about the transaction more rapidly because the transactions are processed more efficiently.

14 Claims, 3 Drawing Sheets

U.S. PATENT DOCUMENTS

| | | | |
|---|---|---|---|
| 2003/0018701 A1* | 1/2003 | Kaestle et al. | 709/201 |
| 2003/0041036 A1* | 2/2003 | Molinari et al. | 705/77 |
| 2004/0098478 A1* | 5/2004 | Koetke et al. | 709/224 |
| 2004/0236666 A1 | 11/2004 | Clark | |

FOREIGN PATENT DOCUMENTS

| | | |
|---|---|---|
| WO | WO 02/080042 A1 | 10/2002 |
| WO | WO 03/030063 A1 | 4/2003 |
| WO | WO 03/030065 A1 | 4/2003 |
| WO | WO 2004/107110 A2 | 12/2004 |

OTHER PUBLICATIONS

Free-flowing information; [JoC Week Edition] Helen Atkinson. Journal of Commerce. New York: Jun. 19, 2000. p. 42.*

OneChem Selects B2B Integration Software From webMethods to Further Develop Its Chemical Industry E-hub Network Business/Technology Editors & Chemicals Writers. Business Wire. New York: Sep. 13, 2000. p. 1.*

Gartner announcement spurs analysts' debate Laura Lyne McMurchie. Computing Canada. Willowdale: Oct. 5, 1998. vol. 24, Iss. 37; p. 25, 2 pgs.*

Descartes.Com. "Inventory Demand Matcher." 2001, http://www.descartes.com, The Descartes Systems Group Inc.

* cited by examiner

MANAGING INFORMATION IN A MULTI-HUB SYSTEM FOR COLLABORATIVE PLANNING AND SUPPLY CHAIN MANAGEMENT

This application hereby incorporates by reference U.S. Provisional Application No. 60/286,216, filed Apr. 24, 2001 and U.S. application Ser. No. 10/132,072, filed Apr. 24, 2002 and claims benefit of U.S. Provisional Application No. 60/473,092, filed May 23, 2003, also hereby incorporated by reference.

BACKGROUND OF THE INVENTION

1. Field of the Invention

This invention relates to managing information in a system of collaborative planning.

2. Related Art

Storing accurate information and responding rapidly to user requests for that information poses many problems in systems for supply chain management. These problems are compounded when (1) the entities in a supply chain are relatively far from the data, and (2) the data is stored in multiple places.

A first problem with information systems used in supply chain management is that inconsistencies in the data arise when multiple parties in a supply chain have write access to a database or when a master database is synchronized from smaller databases that are local to a customer. Under these circumstances, it is not possible for a party to receive accurate information about a transaction when at any one time the data about the transaction can be altered by one or more other parties.

A second problem involves the usability of the supply chain management system. Usability problems arise when data is stored large distances (measured in terms of network distance or geographic distance) from the parties who use the data. Even with high-speed networks, excessively long download and upload times create difficulties in receiving and sending information or successfully completing a transaction. One solution to usability problems involves distributing the information to locations that are closer to the user. However, this solution remains imperfect when the distributed information must be synchronized with one or more other databases associated with the supply chain management system or when the delay is attributable to processing the information.

Lastly, problems arise when one or more of the servers or databases in a distributed system for supply chain management becomes unavailable. Under these circumstances, problems arise because a user cannot access the most recent version of data that is stored at the local database.

SUMMARY OF THE INVENTION

The invention provides a method and system for managing information in a multi-hub system for supply chain management and collaborative planning. A buyer, seller, negotiator, supplier or other entity (collectively known as trading partners) in a supply chain conducts business using one or more of the local electronic hubs that are remotely coupled to each other. Each local hub includes one or more servers, databases and computer applications that are disposed for receiving and sending messages, for caching data, and modifying information. Although these local hubs can be distributed throughout the world, they share a common set of distributed data. The consistency of this data is safeguarded by controlling who has the authority to write to a portion of that data. A set of regional authorities are distributed among the local hubs such that each regional authority protects different portions of the distributed data associated with the local hubs by controlling who may write to the portion of the data that is under the control of the regional authority.

Regional authorities control access to data by identifying a local hub that owns that data. In this context, ownership of the data means that the owner has write access to the data. The authority to assign write access to the data rests with the regional authority. Regional authorities partition the set of all data maintained by the supply chain management system such that a regional authority has authority over a distinct subset of that data. Regional authorities coordinate with each other so that each particular regional authority can obtain instructions for data not belonging to that particular regional authority.

The number and location of regional authorities is established either (1) by the regional authorities themselves, in peer-to-peer cooperation, or (2) by a central authority in the supply chain system. In one embodiment, the number and location of regional authorities is intended to be optimized for both elements of local control (for example, distributed computing capability, failover capability, and lower communication latency) and for elements of clear cooperation (for example, ease of identifying the appropriate regional authority, and simplicity of synchronization). Different factors can influence which local hub has regional authority over a particular portion of the data. These factors include:

- Physical region (for example, the regional authority for all of the local hubs in the eastern United States might be located in Boston);
- Class of goods (for example, there may be a regional authority for disk drives, another regional authority for memory chips, and so on);
- Subnet locations (for example, a set of subnet locations may be assigned to a particular regional authority);
- Proximity (as measured by geography or network location) to a particularly valuable client); and
- Network location as measured by ping time (this is particularly useful, when trying to offer optimal download time to a valued client).

In another aspect of the invention, messages that require processing are separated from messages that do not requiring processing. Messages that require processing are sent to a server (called a heavyweight server) where processing takes place. Messages that do not require processing are sent to a different server (called a lightweight server). By segregating traffic according to whether processing is required, clients that have simple requests can obtain the information they need quickly because the request is not slowed down while more complex requests are completed first. Some transactions can be separated into tasks that do not involve processing and tasks that do involve processing. Such transactions can be performed using both heavyweight servers and lightweight servers. For example, if a supplier wishes to tell a buyer that a shipment will not be made as scheduled, the transfer of messages from the supplier to the buyer to that effect requires little processing and can be sent using a lightweight server. However, other aspects (such as updating a bill so that the buyer is not changed for the shipment, finding a new supplier, or identifying substitute goods or other actions) require further processing; these aspects of the transaction are handled using a heavyweight server.

Although the invention has general applicability to electronic commerce among multiple collaborators, buyers, suppliers, or designers in a supply chain or collaborative planning environments, it can be used in any transaction involving multiple parties. Moreover, techniques used by a preferred embodiment of the invention are also generally applicable to fields other than the specific applications disclosed herein.

INCORPORATED DISCLOSURES

Inventions described herein can be used in conjunction with inventions described in the following applications:

Application Ser. No. 09/823,888, filed Mar. 30, 2001, in the name of inventor Gregory Clark, titled "Private Collaborative Planning in a Many to Many Hub";

Application Ser. No. 10/087,444, filed Mar. 1, 2002, in the name of inventor Erik Stuart, titled "On-Line Auction with Different Rules Applicable to Different Phases";

Application Ser. No. 09/967,905, filed Sep. 28, 2001, in the name of inventor Gregory Clark, titled "Method for Business to Business Collaborative Viral Adoption";

Application Ser. No. 09/967,907, filed Sep. 28, 2001, in the name of inventor Gregory Clark, titled "Securing Information in a Design Collaboration and Trading Partner Environment", in the name of inventor Gregory Clark.

These applications are hereby incorporated by reference as if fully set forth herein. They are collectively referred to as the "incorporated disclosures."

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

Local hub—as used herein, the term "local hub" refers to a system for electronic supply chain management and collaborative design, including one or more web servers that is situated in a location that is substantially proximate to a large number of trading partners. For example, a local hub may serve trading partners in a particular country (such as a local hub in Japan) or to serve partners in a particular business (such as a local hub situated in Armonk, N.Y. that serves IBM).

Regional authority—as used herein, the term "regional authority" refers to a local hub which has the authority to determine who may write to a database in a system for supply chain management or collaborative design.

Heavyweight server—as used herein, the term "heavyweight server" refers to one or more servers at a local hub that are dedicated to responding to requests that require moderate or extensive processing.

Lightweight server—as used herein, the term "lightweight server" refers to one or more servers at a local hub that are dedicated to responding to requests that require little or no processing.

Ownership of the data—as used herein, the term "ownership of the data" refers to who has write access, who has authority to assign write access or who has a privacy interest in a particular portion of a database associated with an electronic system of supply chain management or collaborative design.

Trading partner—as used herein, the term "trading partner" refers to a buyer, seller, supplier, negotiator, or other party engaged in supply chain management or collaborative design.

System Elements

Figure 1:
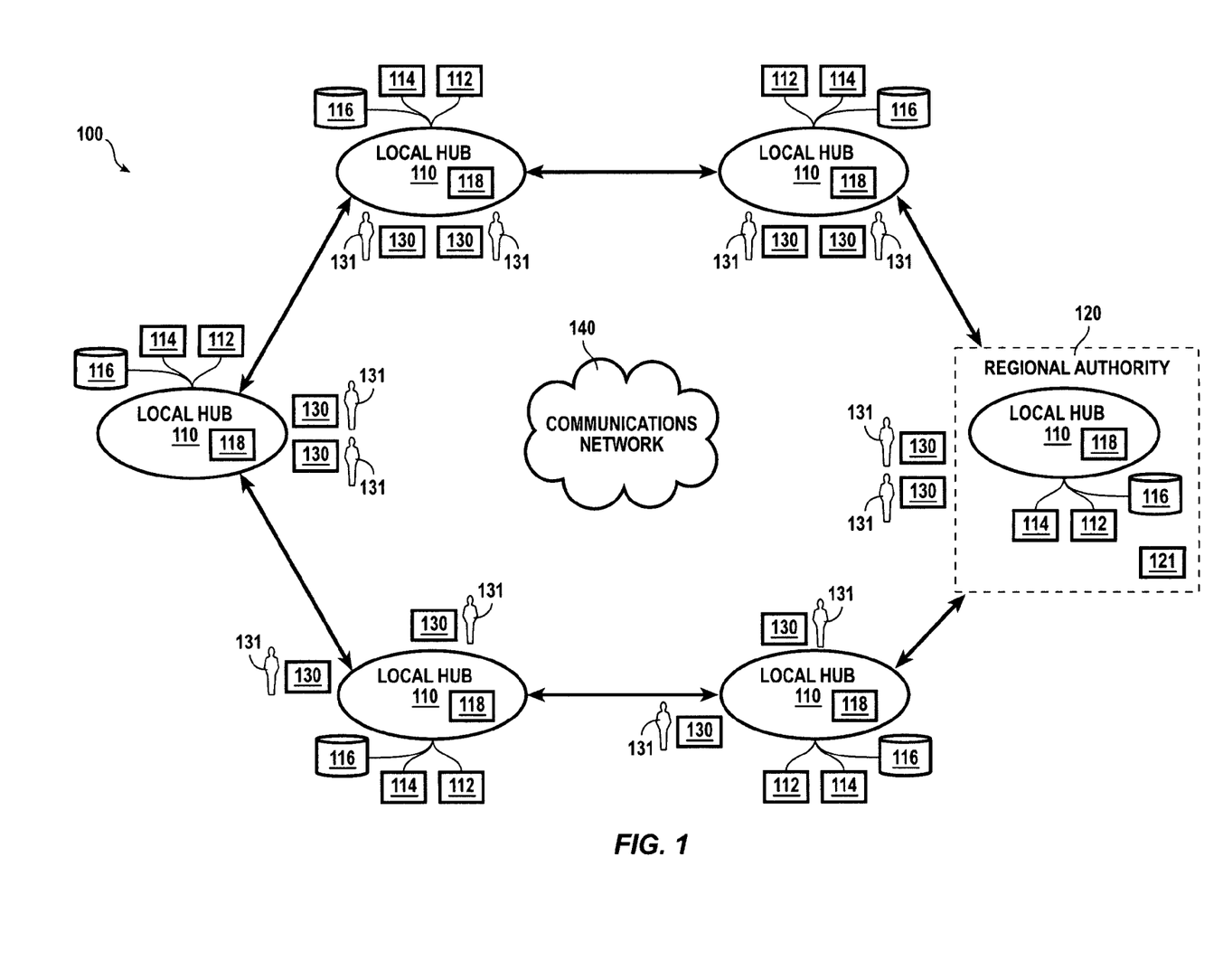
FIG. 1 shows a block diagram of a high level view of a system of collaborative planning and supply chain management including a plurality of local hubs.

FIG. 1 shows a block diagram of a system of supply chain management or collaborative planning including a plurality of hubs.

A system 100 includes a plurality of local hubs 110, at least one client device 130 under the control of a trading partner 131 and a communication network 140. These local hubs 110 are geographically distributed in various locations throughout the world where trading partners 131 are likely to be located. For example, the system 100 may include a first local hub 110 in Tokyo, a second local hub 110 in Bangalore, and a third local hub 110 in London. Each local hub 110 can be coupled with other local hubs 110 so as to share information concerning supply chain management or collaborative design. At least one of the local hubs 110 is designated as a regional authority 120.

Each local hub 110 in the plurality of local hubs 110 includes one or more heavyweight servers 112, one or more lightweight servers 114, a database 116 and a software module 118. In some embodiments, the local hub 110 may include either a heavyweight server 112 or a lightweight server 114 instead of both.

The heavyweight servers 112 include sufficient software to satisfy relatively complex requests from trading partners 131 and to process transactions between these trading partners 131. Examples of such transactions includes purchases and sales, modifications of existing inventory, commitments and other transactions that require information to be written to the database 116 or require a moderate amount of processing. In the event that the heavyweight server 112 identifies a request that is substantially less complex, it forwards the request to the lightweight server 114. In this way, the heavyweight server 112 is reserved for more complex processing tasks.

A lightweight server 114 includes sufficient software to satisfy requests from trading partners 131 that do not require much processing. Examples of such requests include requests to see what products or inventory are available, requests for confirmation of transactions that have already taken place, messages between trading partners as to the status of transaction and other requests for information that can be easily satisfied. In general, these transactions do not require writing to the database 116 or significant amounts of processing power. In the event that the lightweight server 114 identifies a request that is substantially more complex, the lightweight server 114 forwards the request to the heavyweight server 112. Since the lightweight server 114 does not provide complex processing, requests can be responded to quickly in real time or very close to real time.

In some embodiments, a local hub 110 includes either one or more lightweight servers 114 or one or more heavyweight servers 112. For example, lightweight servers 114 may be provided to some geographic locations and heavyweight servers 112 may be provided to other locations. Such embodiments decrease the latency for simple transactions and centralize the processing for more complex transactions.

The database 116 in each local hub 110 includes the same or substantially similar information. Each database 116 is periodically updated with respect to the other databases 116 in a process known as synchronization. Each portion of each database 116 has an identifiable owner. The owner of a particular portion of a database 116 is usually a trading partner 131 at the local hub 110 who also has right to modify the data in that portion. For example, a disk drive supplier who stores information about available inventory in the database 116 is the owner of that information. Generally, parties who may exercise ownership rights are buyers and sellers. However, in other embodiments, ownership of data is determined in response to (1) who has a right to the goods or money described by the information in the database 116, (2) who has a privacy right with respect to the information, and (3) other parameters relating to a party's relationship to the information.

The software module 118 distinguishes between requests from trading partners 131 that require moderate to extensive processing and those requests that require little to no processing. Requests that require moderate to extensive processing are directed to the heavyweight server 112. Requests that require little to no processing are directed to the lightweight server 114. In some embodiments, the software module 118 is implemented as an interface coupling the heavyweight servers 112 and the lightweight servers 114. In other embodiments, the software module may reside on the client side.

In a preferred embodiment, control of the data in a local hub 110 is vested in a regional authority 120. The regional authority 120 has control of the data owned by the entities in a particular region of the world. The regional authority 120 preferably includes a local hub 110, but in other embodiments, may include a specialized device that is distinct in function from a local hub 110. Possession of a logical token 121 indicates what device (that is, which local hub 110) is the regional authority 120 at that time.

The regional authority 120 maintains data consistency by controlling who may write to the data in at least one database 116 (or portion of a database 116), and by controlling who may perform any other activity that changes the state of the information in the database 116. Since the regional authority 120 does not allow multiple parties to write to the same information at the same time, the information among all the local hubs 110 is consistent.

A local hub 110 is designated as a regional authority 120 in response to a number of different factors, including Physical region (for example, the regional authority for all of the local hubs in the eastern United States might be located in Boston);

Class of goods (for example, there may be a regional authority for disk drives, another regional authority for memory chips, and so on);

Subnet locations (for example, a set of subnet locations may be assigned to a particular regional authority);

Proximity (as measured by geography or network location) to a particularly valuable client); and Network location as measured by ping time (this is particularly useful, when trying to offer optimal download time to a valued client).

In one embodiment, the number and location of regional authorities is intended to be optimized for both elements of local control (for example, distributed computing capability, failover capability, and lower communication latency) and for elements of clear cooperation (for example, ease of identifying the appropriate regional authority, and simplicity of synchronization). In such embodiments, a regional authority 120 can transfer it's authority to another local hub 110 (for example, if business conditions change) by transferring the logical token 121. This token 121 is exchanged between an outgoing regional authority 120 and an incoming regional authority 120. This token 121 may include a set of computer program code, a set of access privileges, or other similar indicator of authority.

The plurality of local hubs 110 can also implement a failover configuration among the local hubs 110. For example, if a local hub 110 in Los Angeles fails because of a local disaster (or due to overuse, or any other reason), trading partners 131 can be transparently redirected to a different local hub 110 in San Francisco. Redirection might be performed by a software element in a client device 130 under the control of a trading partner 131, by a software element in a redirecting router associated with the local hub 110, or otherwise. Thus, there is no break in service or loss of data, due to synchronization to reflect activity at the local hubs 110.

The client devices 130 may include a personal computer, a laptop, a hand-held computer (such as a personal digital assistant), a set of multiple computing devices operating in concert or cooperation, a portion of a computing device used for a particular function (such as a software package used on a server), or some combination or mixture thereof, or any other device fitting within the general Turing paradigm. The trading partners 131 include one or more of the following: buyers, sellers, collaborators, entities in a supply chain, senders of information, recipients of information and other users of a system 100. In one embodiment, the trading partners 131 include companies involved in electronics and computers.

The client devices 130 may access the local hubs 110 through (1) an element included in a browser on the client side, (2) a computer program stored on the client side that requires processing to be performed at the local hub 110 (for example, a thin client) or a enterprise link where dedicated bandwidth is provided between the client device 130 and the local hub 110.

The communication network 140 is disposed for communicating data between (1) client devices 130 and the local hubs 110, and (2) between the different local hubs 110. In a preferred embodiment, the communication network 140 includes a packet switched network such as the Internet, as well as (in conjunction with or instead of) an intranet, an enterprise network, an extranet, a virtual private network, a virtual switched network, or in one preferred embodiment in conjunction with a set of dedicated communication links. In alternative embodiments, the communication network 140 may include any other set of communication links that couple the local hubs 110 with each other and with client devices 130. In some embodiments, dedicated bandwidth can be used to couple the local hubs with each other. In other embodiments, dedicated bandwidth can be used to couple client device 130 under the control of a valued trading partner 131 with the local hub 110. In this way, different classes of service can be provided to different trading partners 131.

FIG. 2 shows a series of messaging patterns for lightweight and heavyweight transactions in a system for collaborative planning and supply chain management.

Figure 2A:
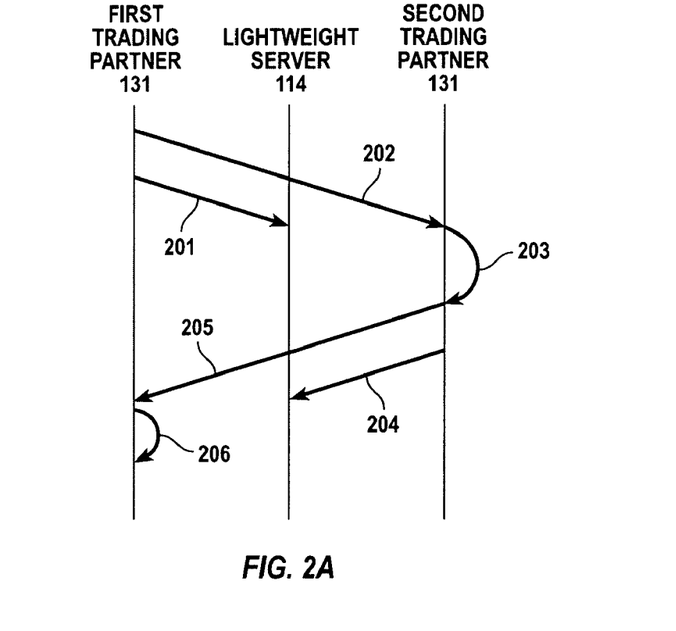
FIG. 2 shows a series of messaging patterns for lightweight and heavyweight transactions in a system for collaborative planning and supply chain management.

FIG. 2A shows a messaging pattern for a transaction involving a lightweight server 114. Although the transaction described herein involves a message from a supplier to a buyer that a scheduled shipment will not arrive, this messaging pattern is applicable for any transaction or part of a transaction that does not involve moderate or extensive processing at the local hub 110.

In data flow 201, a message is sent from a first trading partner 131 (in this example, a supplier) to the lightweight server 114 indicating that a scheduled shipment will not arrive.

In a data flow 202, the message regarding the shipment is sent from the lightweight server 114 to the second trading partner 131 (in this case a buyer). In those embodiments in which software module 118 resides on the client side, the acknowledgment may be sent directly from the first trading partner 131 to the second trading partner 131.

In a data flow 203, the second trading partner 131 receives and processes the information. For example, the second trading partner 131 may notify the receiving department that the shipment will not arrive.

In a data flow 204, the second trading partner 131 sends a message to the lightweight server 114. In this example, this may include an acknowledgment that the message was received.

In a data flow 205, the lightweight server 114 relays the acknowledgment from the second trading partner 131 to the first trading partner 131. In those embodiments in which software module 118 resides on the client side, the acknowledgment may be sent directly from the second trading partner 131 to the first trading partner 131

In a data flow 206, the first trading partner 131 processes the acknowledgment.

Figure 2B:
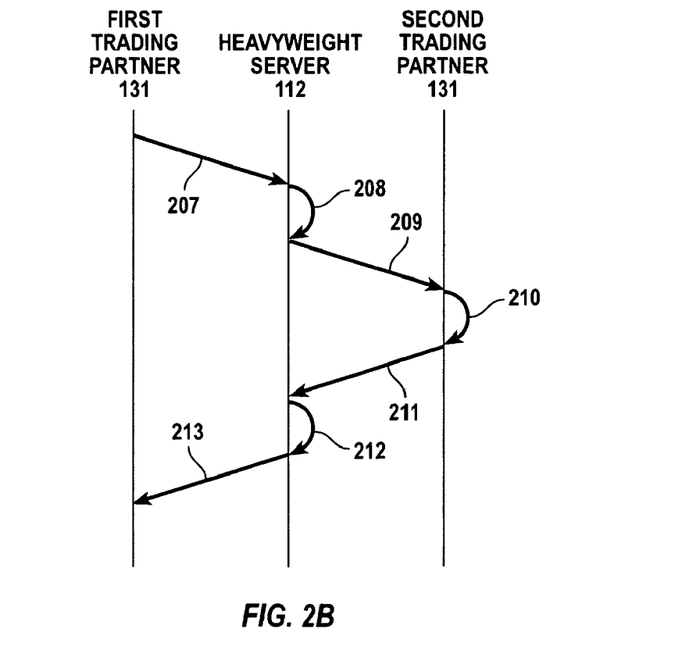

FIG. 2B shows a messaging pattern for a transaction involving a heavyweight server 112. Although the transaction described herein involves a message from a supplier to a buyer that a scheduled shipment will not arrive, this messaging pattern is applicable for any transaction, or part of a transaction that involves moderate or extensive processing at the local hub 110.

In a data flow 207, a first trading partner 131 (in this example, a supplier) sends a message to the local hub 110 that a shipment to a second trading partner 131 (in this example, a buyer) will not be available as scheduled.

In a data flow 208, heavyweight server 112 at the local hub 110 receives the message and processes it. This processing may include:

Identifying substitute suppliers;
Identifying substitute goods;
Identifying a list of negotiating partners;
Other steps such as may be necessary to mitigate damages due to the missing shipment In a data flow 209, the heavyweight server 112 relays a message concerning the results of this processing to the second trading partner 131. These results might include:

A list of substitute suppliers
A list of substitute goods
Information about a negotiation for new goods;
Other information relating to the cancelled shipment.

In a data flow 210, the second trading partner 131 receives this information and processes it. Processing the information may include deciding among the suppliers, substitute goods, determining if a negotiation is satisfactory, modifying production schedules to reflect the lack of anticipated goods and other actions to compensate for the lack of goods.

In a data flow 211, the second data partner 131 sends a result of this processing to the heavyweight server 112. The result of the processing might include a list of parties to be included in a negotiation for replacement goods, an acceptable price range for substitute goods, a deadline for a substitute shipment or other information.

In a data flow 212, the heavyweight server 112 receives the information from the second data partner 131 and processes it. Processing might include setting up negotiating dates, identifying other trading partners that have available inventory within the acceptable price range or by the stated deadline.

In a data flow 213, the heavy weight server 112 sends a message to one or more suppliers that may be involved in subsequent transactions to replace the missing goods.

Method of Operation

Figure 3:
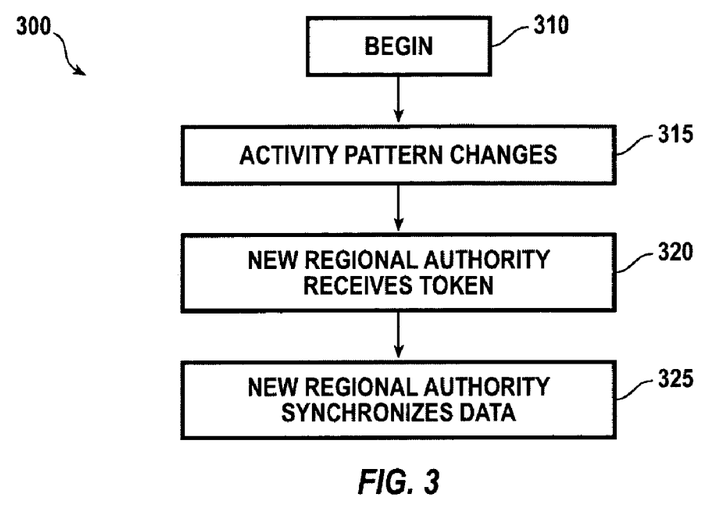
FIG. 3 shows a method of synchronizing information in a system of collaborative planning and supply chain management that includes a plurality of local hubs.

A method 300 includes a set of flow points and process steps as described herein.

In one embodiment, the method 300 is performed by the system 100. In other embodiments, the method 300 may be performed by other systems. Although the method 300 is described serially, the steps of the method 300 can be performed by separate elements in conjunction or parallel, whether asynchronously, in a pipelined manner, or otherwise. There is no particular requirement that the method 300 be performed in the same order in which this description lists the steps, except where so indicated.

At a flow point 310, the system 100 is ready to begin performing a method 300. At the outset, a first local hub 110 is designated as the regional authority 120 for a plurality of other local hubs 110. The regional authority 120 possesses a token 121. The token 121 allows the regional authority 120 to control who may write to a database 116.

At a step 315, a pattern of activity within the system 100 changes so it is desirable to designate a different local hub 110 as regional authority 120. This shift may correspond to a change in business activity or a failure at a local hub. It may also be desirable to designate a different local hub 110 as regional authority 120 in response to the desires of a valued customer or some other variable. As a result of these changes, a different local hub 110 is identified.

At a step 320, a token 121 is sent from the regional authority 120 to the local hub 110 identified in step 315. The local hub 110 that receives the token becomes the new regional authority 120. The former regional authority 120 no longer has the authority to synchronize data among the other local hubs 110, and becomes an ordinary local hub 110.

At a flow point 325, the new regional authority 120 is ready to synchronize data on behalf of the system 100. Steps 315 and 320 are repeated whenever there is a significant shift in business activity or in any other parameter such as may be used to identify the regional authority 120.

Figure 4:
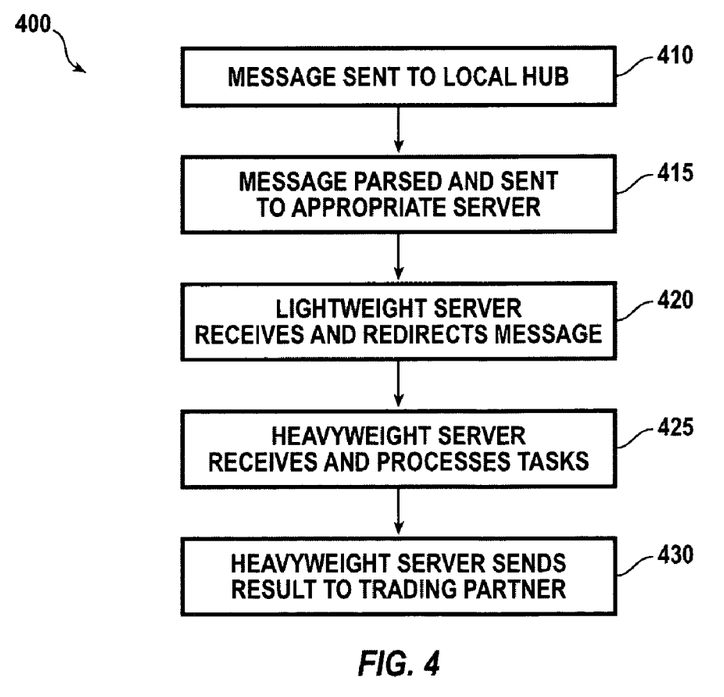
FIG. 4 shows a method of using lightweight and heavyweight servers in a system for collaborative planning and supply change management.

FIG. 4 shows a method of using lightweight and heavyweight servers in a system for collaborative planning and supply change management.

In one embodiment, the method 400 is performed by the system 100. In other embodiments, the method 400 may be performed by other systems. Although the method 400 is described serially, the steps of the method 400 can be performed by separate elements in conjunction or parallel, whether asynchronously, in a pipelined manner, or otherwise. There is no particular requirement that the method 400 be performed in the same order in which this description lists the steps, except where so indicated.

In a flow point 410, a first trading partner 131 wishes to conduct business at a local hub 110. This transaction may involve selling or buying goods (for example, disk drives, or other computer parts), conducting an auction, making a request for quote, conducting a negotiation, communicating with a second trading partner 131 about an transaction that is already is process or some other type of business that can be performed at the local hub 110. The first trading partner 131 uses a client device 130 to contact the local hub 110 and sends a message regarding the desired transaction.

In a step 415, the local hub 110 receives the message. Software module 118 parses the message and identifies tasks that should be performed by a lightweight server 114 and tasks that should be performed by a heavyweight server 112. The software module 118 generates lists of these tasks and sends the list to the appropriate server. Tasks that require little or no processing are sent to the lightweight server 114. Tasks that require moderate or extensive processing are sent to the heavyweight server 112. In some embodiments, the heavyweight server 112 and lightweight server 114 reside at the same local hub 110. In other embodiments, the heavyweight server 112 and lightweight server reside at different local hubs.

In a step 420, the lightweight server 114 receives the task list from the software module 118 and redirects the message to the intended trading partner 131.

In a step 425, the heavyweight server 112 receives the task list from the software module 118 and processes it. This processing may involve storing information in database 116, calculating information to send to the intended trading partner 131, calculating information to send to other prospective trading partners 131 or providing the first trading partner 131 with processed information or other activities that require computer processing. In one embodiment, steps 420 and 425 occur approximately simultaneously. However, since step 420 requires little or no processing, it is usually completed before step 425.

In a step 430, the heavyweight server 112 sends a result associated with the processing to the first trading partner 131 or a different trading partner 131.

Additional messages may be sent between the heavyweight server 112, the lightweight server 114, and one or more trading partners 131. Each additional message involves performing step 415 so as to parse the message and determine whether tasks associated with the message should be sent, in whole or in part to the heavyweight server 112, the lightweight server 114 or both. Steps 420 through 430 are performed as appropriate until the transaction is complete.

Alternative Embodiments

Although preferred embodiments are disclosed herein, many variations are possible which remain within the concept, scope and spirit of the invention; these variations would be clear to those skilled in the art after perusal of this application.

The invention claimed is:

1. A system for electronic supply chain management and collaborative planning, including:
   a plurality of local hubs, remotely coupled to each other;
   a set of supply chain information stored in a database coupled to each of said local hubs, wherein said set of supply chain information comprises a common set of data distributed among each of the local hubs, said set of supply chain information comprising a plurality of data portions respectively owned by one or more business entity relatively proximate to each said local hub;
   a set of regional authorities controlling access to said supply chain information, wherein each given regional authority of said set of regional authorities has authority over said at least one of said local hubs, said given regional authority controlling which of said at least one of said local hubs may write to one or more of said data portion controlled by said given regional authority;
   a first server coupled to at least one of said local hubs, wherein said first server is dedicated to process a first message type that requires access to and processing of said supply chain information stored in said database;
   a second server coupled to said at least one of said local hubs, wherein said second server is dedicated to process a second message type that does not require access to and processing of said supply chain information stored in said database; and
   a computer program coupled to said at least one of said local hubs to receive a message generated from a client device identifying a transaction, to determine whether said message requires access to and processing of said supply chain information stored in said database based on said transaction, to send said message to said first server when said message is determined to be said first message type, and to send said message to said second server when said message is determined to be said second message type.

2. A system as in claim 1, wherein at least one of said local hubs is designated as said regional authority to control synchronization of said set of supply chain information stored at other said local hubs.

3. A system as in claim 2, wherein said set of supply chain information is synchronized by restricting which local hub in said plurality of local hubs can perform a write operation to the set of information.

4. A system as in claim 2, wherein said regional authority includes a token, wherein said token permits said regional authority to exercise control over who may write to one or more data portion.

5. A system as in claim 2, wherein the designation of said regional authority is determined by at least one of the following: (1) subnet location, (2) class of goods, (3) proximity to a valued client, and (4) network locations as measured by geography or network location.

6. A system as in claim 2, wherein the designation of said regional authority is responsive to which local hub in said plurality of local hubs is experiencing more business activity than other local hubs in said plurality of local hubs.

7. A system as in claim 6, wherein said business activity is measured by at least one of the following: (1) number of transactions, (2) number of units being traded, and (3) monetary value of transactions.

8. A system as in claim 1, wherein said supply chain information regards an electronic transaction performed by said local hub or a business entity that conducts business using said local hub.

9. A method for processing transactions at a hub for electronic supply chain management, said method including steps of:
   receiving messages from at least one client device at a software module of a local hub, said local hub being one of a plurality of local hubs remotely coupled to each other via a communication network, said software module executable by a processing device, said local hub coupled to a database of information regarding supply chain management;

parsing each of said messages and determining whether each message requires access to and processing of information stored in said database;

separating each of said messages into a first type of message or a second type of message, wherein said first type of message requires access to and processing of information stored in said database, and said second type of message does not require access to and processing of information stored in said database;

sending said first type of message to a heavyweight server, wherein said heavyweight server accesses information stored in said database, processes said first type of message and said information stored in said database, and transmits data resulting from the processing of said first type of message and said information stored in said database;

sending said second type of message to a lightweight server, wherein said second type of message is transmitted from said lightweight server without accessing and processing information stored in said database;

parsing said database into data portions for which said local hub has write access authorization, and data portions for which said local hub does not have write access authorization;

for each said first type of message, determining whether said first type of message requires writing to said database, and permitting writing only to said data portions of said database for which said local hub has write access authorization; and performing a business transaction by said local hub by said writing to said data portions of said database for which said local hub has write access authorization.

10. A method as in claim 9, further including steps of performing a series of calculations and storing a result in said database.

11. A system for electronic supply chain management and collaborative planning, including:

a plurality of local hubs, remotely coupled to each other, each of said plurality of local hubs including:

a database to store supply chain information, wherein said supply chain information comprises a common set of data distributed among each of the plurality of local hubs, said set of supply chain information comprising a plurality of data portions respectively owned by business entities relatively proximate to each said local hub;

a heavyweight server to process a first type of message that requires access to and processing of said supply chain information stored in said database; and a lightweight server to process a second type of message that does not require access to and processing of said supply chain information stored in said database;

a first regional authority corresponding to one of said plurality of local hubs for controlling access to said supply chain information in databases associated with a first group of said plurality of local hubs, wherein said first regional authority has authority over which of said first group of said plurality of local hubs may write to one or more of said data portions controlled by said first regional authority;

a second regional authority corresponding to another one of said plurality of local hubs for controlling access to said supply chain information in databases associated with a second group of said plurality of local hubs, wherein said second regional authority has authority over which of said second group of said plurality of local hubs may write to one or more of said data portions controlled by said second regional authority; and a communication network to communicate between said first regional authority and said second regional authority, wherein said first regional authority requests instructions for obtaining one or more of said data portions under control of said second regional authority.

12. A system as in claim 11, wherein said one of said plurality of local hubs is designated as said first regional authority and said other one of said plurality of local hubs is designated as said second regional authority based on factors selected from a group consisting of a physical region in which said first and second groups of said plurality of local hubs are located, a class of goods in databases associated with said first and second groups of said plurality of local hubs, a subnet location, a proximity to a valued client, and a network location as measured by a ping time.

13. A system for electronic supply chain management and collaborative planning, including:

a plurality of local hubs, remotely coupled to each other via a communication network and each including:

a database to store a set of information, wherein said set of information comprises a common set of data distributed among each of the local hubs, and further comprises a plurality of data portions for which respective ones of said local hubs have write authorization access;

a first server to process a first message type that requires access to and processing of said information stored in said database;

a second server to process a second message type that does not require access to and processing of said information stored in said database; and a computer program executable by at least one of said first and second servers in response to a message from a client device identifying a transaction, to determine whether said message is said first message type or said second message type based on said transaction, to send said message to said first server when said message is determined to be said first message type, and to send said message to said second server when said message is determined to be said second message type; and said computer program further to determine whether said message requires writing to said database and to determine a particular one of said local hubs that would write to said database, said computer program permitting writing only to the data portions of said database for which the particular one of said local hubs has write authorization access.

14. A system as in claim 1, wherein the computer program submits the message to said given regional authority in order to write data from said message to said database.

* * * * *